(12) United States Patent
Kim

(10) Patent No.: US 10,384,719 B2
(45) Date of Patent: Aug. 20, 2019

(54) METHOD AND APPARATUS FOR REMOTELY CONTROLLING VEHICLE PARKING

(71) Applicant: HYUNDAI MOTOR COMPANY, Seoul (KR)

(72) Inventor: Jong Gyu Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 107 days.

(21) Appl. No.: 15/014,646

(22) Filed: Feb. 3, 2016

(65) Prior Publication Data

US 2017/0129537 A1 May 11, 2017

(30) Foreign Application Priority Data

Nov. 10, 2015 (KR) .......................... 10-2015-0157406

(51) Int. Cl.
*B62D 15/02* (2006.01)
*G05D 1/00* (2006.01)
(Continued)

(52) U.S. Cl.
CPC .......... *B62D 15/0285* (2013.01); *B62D 1/00* (2013.01); *B62D 15/027* (2013.01);
(Continued)

(58) Field of Classification Search
CPC .... B62D 15/0285; B62D 1/00; B62D 15/027; G05D 1/0011; G05D 1/0088; G06K 9/00771; G06T 7/004
(Continued)

(56) References Cited

U.S. PATENT DOCUMENTS 6,571,193 B1 * 5/2003 Unuma ................ A43B 3/0005
340/853.2
7,202,775 B2 * 4/2007 Yezersky .............. B60R 25/257
307/10.1
(Continued)

FOREIGN PATENT DOCUMENTS

CN  103359050 A  10/2013
CN  103857583 A   6/2014
(Continued)

OTHER PUBLICATIONS

Korean Office Action dated Nov. 9, 2016 issued in Korean Application. No. 10-2015-0157406.
(Continued)

*Primary Examiner* — Angelina Shudy
(74) *Attorney, Agent, or Firm* — Morgan, Lewis & Bockius LLP

(57) ABSTRACT

A method for remotely controlling vehicle parking including recognizing a smart key in a first region by a vehicle, upon recognizing the smart key, activating a distance sensor of a camera and a parking assistance system (PAS) by the vehicle, recognizing a driver having the smart key through the activated camera, setting a position of the driver as a reference point by the vehicle, and calculating a detected distance of the driver and the vehicle through the PAS, and after the setting of the reference point and the calculating of the detected distance, moving forward or backward based on the detected distance or turning left or right based on a change in a position of the driver in right and left directions with respect to the reference point while receiving a parking signal from the smart key.

22 Claims, 8 Drawing Sheets

(51) Int. Cl.
*G06K 9/00* (2006.01)
*B62D 1/00* (2006.01)
*G06T 7/70* (2017.01)

(52) U.S. Cl.
CPC ....... *G05D 1/0011* (2013.01); *G06K 9/00771* (2013.01); *G06T 7/70* (2017.01)

(58) Field of Classification Search
USPC .......................................................... 701/2
See application file for complete search history.

(56) References Cited

U.S. PATENT DOCUMENTS

| | | | | |
|---|---|---|---|---|
| 7,551,980 | B2* | 6/2009 | Sakagami | G05D 1/0251 318/568.16 |
| 7,643,913 | B2* | 1/2010 | Taki | B60R 25/2009 340/426.16 |
| 8,218,816 | B2* | 7/2012 | Sonoura | G06K 9/32 382/103 |
| 8,392,065 | B2* | 3/2013 | Tolstedt | G05D 1/0214 701/41 |
| 9,073,484 | B2* | 7/2015 | Aimura | B60R 1/00 |
| 9,451,447 | B2* | 9/2016 | Tibbitts | H04W 48/04 |
| 9,696,813 | B2* | 7/2017 | Chiu | G06F 3/017 |
| 9,731,714 | B2* | 8/2017 | Kiriya | B60W 30/06 |
| 9,772,193 | B1* | 9/2017 | Mendelson | H04W 4/90 |
| 9,789,904 | B2* | 10/2017 | Jecker | B62D 15/025 |
| 10,025,305 | B2* | 7/2018 | So | A47L 9/2852 |
| 2006/0192650 | A1* | 8/2006 | Shinada | B60R 25/24 340/5.2 |
| 2008/0101656 | A1 | 5/2008 | Barnes et al. | |
| 2008/0117079 | A1* | 5/2008 | Hassan | B60R 25/045 340/901 |
| 2010/0063663 | A1* | 3/2010 | Tolstedt | G05D 1/0231 701/23 |
| 2010/0063680 | A1* | 3/2010 | Tolstedt | G05D 1/0214 701/41 |
| 2010/0250022 | A1* | 9/2010 | Hines | G05D 1/101 701/2 |
| 2010/0283653 | A1* | 11/2010 | Dai | G04F 10/005 341/166 |
| 2011/0026770 | A1* | 2/2011 | Brookshire | G05D 1/0251 382/103 |
| 2011/0170748 | A1* | 7/2011 | Aimura | G01C 3/085 382/106 |
| 2012/0316704 | A1* | 12/2012 | Ohbayashi | B60R 25/04 701/2 |
| 2012/0320206 | A1* | 12/2012 | Sim | H04N 5/222 348/148 |
| 2013/0099892 | A1* | 4/2013 | Tucker | G07C 9/00309 340/5.61 |
| 2013/0151036 | A1* | 6/2013 | Harumoto | F02N 11/0807 701/2 |
| 2013/0151038 | A1* | 6/2013 | Harumoto | G06F 17/00 701/2 |
| 2013/0162825 | A1 | 6/2013 | Yoon et al. | |
| 2013/0229524 | A1 | 9/2013 | Vovkushevsky et al. | |
| 2013/0265428 | A1 | 10/2013 | Yoon et al. | |
| 2013/0268144 | A1* | 10/2013 | Du | G08C 17/02 701/2 |
| 2013/0316704 | A1* | 11/2013 | Home | H04W 8/12 455/433 |
| 2014/0058613 | A1* | 2/2014 | Leinfelder | B62D 15/028 701/28 |
| 2014/0180523 | A1* | 6/2014 | Reichel | B62D 15/0285 701/23 |
| 2014/0327774 | A1* | 11/2014 | Lu | G06K 9/00791 348/148 |
| 2014/0333455 | A1 | 11/2014 | Lee | |
| 2014/0348380 | A1* | 11/2014 | Yoon | G06K 9/32 382/103 |
| 2014/0365032 | A1* | 12/2014 | Park | B62D 15/027 701/2 |
| 2015/0025708 | A1* | 1/2015 | Anderson | A61B 5/6804 701/2 |
| 2015/0088360 | A1* | 3/2015 | Bonnet | B60W 30/06 701/23 |
| 2015/0127208 | A1 | 5/2015 | Jecker et al. | |
| 2015/0127217 | A1* | 5/2015 | Lee | B60W 30/06 701/36 |
| 2015/0279131 | A1* | 10/2015 | Nespolo | G07C 9/00182 340/5.72 |
| 2015/0332532 | A1* | 11/2015 | Lee | G07C 9/00563 340/5.72 |
| 2015/0367846 | A1* | 12/2015 | Sans | B62D 15/027 701/23 |
| 2015/0375741 | A1* | 12/2015 | Kiriya | G06K 9/00355 701/2 |
| 2016/0018822 | A1* | 1/2016 | Nevdahs | G05D 1/00 701/26 |
| 2016/0068158 | A1 | 3/2016 | Elwart et al. | |
| 2016/0114798 | A1* | 4/2016 | Kim | B60W 30/09 701/41 |
| 2016/0121849 | A1* | 5/2016 | Kim | G07C 9/00007 701/2 |
| 2016/0188977 | A1* | 6/2016 | Kearns | G06K 9/00664 348/113 |
| 2016/0207526 | A1 | 7/2016 | Franz et al. | |
| 2016/0251891 | A1* | 9/2016 | Herthan | B60R 25/2054 49/31 |
| 2016/0304087 | A1* | 10/2016 | Noh | B60R 25/24 |
| 2016/0304198 | A1* | 10/2016 | Jourdan | B64C 39/024 |
| 2016/0327950 | A1* | 11/2016 | Bachrach | G05D 1/0016 |
| 2017/0019480 | A1* | 1/2017 | Yokota | B60R 25/2036 |
| 2017/0046545 | A1* | 2/2017 | Bravo Sanchez | G08G 1/14 |
| 2017/0061813 | A1* | 3/2017 | Tao | G09B 9/08 |
| 2017/0309183 | A1* | 10/2017 | Nordbruch | B62D 15/027 |
| 2017/0313247 | A1* | 11/2017 | Hsu | G08G 1/165 |
| 2017/0329329 | A1* | 11/2017 | Kamhi | B60W 50/14 |
| 2017/0342750 | A1* | 11/2017 | Hiramine | B60R 25/245 |
| 2018/0022329 | A1* | 1/2018 | Sannodo | B60T 7/12 701/70 |
| 2018/0029591 | A1* | 2/2018 | Lavoie | B60W 30/06 |
| 2018/0037262 | A1* | 2/2018 | Imai | B60W 30/06 |
| 2018/0039264 | A1* | 2/2018 | Messner | G06K 9/00812 |
| 2018/0082588 | A1* | 3/2018 | Hoffman, Jr. | G08G 1/166 |
| 2018/0105167 | A1* | 4/2018 | Kim | B60W 30/06 |
| 2018/0105208 | A1* | 4/2018 | Kim | B62D 15/0285 |
| 2018/0107207 | A1* | 4/2018 | Kim | B60W 30/06 |
| 2018/0144622 | A1* | 5/2018 | Gage | G08G 1/0175 |
| 2018/0237069 | A1* | 8/2018 | Gehin | B62D 15/0285 |
| 2018/0299900 | A1* | 10/2018 | Bae | G05D 1/0238 |
| 2019/0023223 | A1* | 1/2019 | Yoo | B60R 25/043 |
| 2019/0025816 | A1* | 1/2019 | Vogt | G05D 1/0285 |

FOREIGN PATENT DOCUMENTS

| | | | |
|---|---|---|---|
| EP | 2316709 B1 | 8/2013 | |
| JP | 2006-044484 A | 2/2006 | |
| JP | 2006044484 A * | 2/2006 | ......... B62D 15/027 |
| JP | 2008-174192 A | 7/2008 | |
| JP | 2008174192 A * | 7/2008 | ......... B62D 15/027 |
| JP | 2010-095027 A | 4/2010 | |
| JP | 2012-216079 A | 11/2012 | |
| JP | 2013-123096 A | 6/2013 | |
| JP | 2013-241088 A | 12/2013 | |
| JP | 2015-001778 A | 1/2015 | |
| JP | 2015001778 A * | 1/2015 | |
| JP | 2015-035181 A | 2/2015 | |
| JP | 2015-111386 A | 6/2015 | |
| JP | 2016-185745 A | 10/2016 | |
| KR | 10-2012-0140544 A | 12/2012 | |
| KR | 10-2013-0073256 A | 7/2013 | |
| KR | 10-2013-0085235 A | 7/2013 | |
| KR | 10-2014-0028724 A | 3/2014 | |
| KR | 10-1426468 B1 | 8/2014 | |
| KR | 10-2014-0142993 A | 12/2014 | |
| KR | 10-2015-0006270 A | 1/2015 | |
| KR | 10-1532320 B1 | 7/2015 | |
| KR | 10-2016-0123119 A | 10/2016 | |
| WO | WO-2012161630 A1 * | 11/2012 | ......... G05D 1/101 |

(56) References Cited

FOREIGN PATENT DOCUMENTS

OTHER PUBLICATIONS

Non-Final Office Action issued in related U.S. Appl. No. 15/833,281, dated May 17, 2018.
Korean Office Action issued in corresponding Korean Patent Application No. 10-2016-0184292, dated Feb. 8, 2018, with English Translation.
Extended Search Report issued in related European application No. 17205261.5, dated May 29, 2018.
Chinese Office Action dated Apr. 8, 2019 issued in Chinese Patent Application No. 201610214576.7 (with English translation).

* cited by examiner

METHOD AND APPARATUS FOR REMOTELY CONTROLLING VEHICLE PARKING

CROSS-REFERENCE TO RELATED APPLICATION

This application claims the benefit of priority to Korean Patent Application No. 10-2015-0157406, filed on Nov. 10, 2015 with the Korean Intellectual Property Office, the disclosure of which is hereby incorporated by reference as if fully set forth herein.

TECHNICAL FIELD

The present disclosure relates to a method and apparatus for remotely controlling vehicle parking, and more particularly, to a method and apparatus for remotely controlling parking or pulling out of a vehicle according to a change in a driver position.

BACKGROUND

Recently, parking difficulties have increased due to an increase in vehicles. With regard to such parking difficulties, parking spaces are limited and some parking spaces may not accommodate every vehicle. A parking space size may be determined according to the parking standard of a horizontal length of 2.3 m and a vertical length of 5 m, but in reality, a sufficient parking space may frequently not be provided according to parking states of surrounding vehicles.

An inexperienced driver may have serious difficulties in parking or pulling a vehicle out of a narrow parking space. For example, it may take a significant amount of time to park or pull out a vehicle from a space for getting into or out of a vehicle due to a narrow parking space.

SUMMARY OF THE DISCLOSURE

Accordingly, the present disclosure is directed to a method and apparatus for remotely controlling vehicle parking that substantially obviates one or more problems due to limitations and disadvantages of the related art.

An object of the present disclosure is to provide a method and apparatus for remotely controlling vehicle parking.

In detail, an object of the present disclosure is to provide a method and apparatus for remotely controlling vehicle parking, for parking the vehicle in a narrow parking space while a driver is not in the vehicle or after the driver pre-gets out of the vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for remotely controlling vehicle parking includes recognizing a smart key in a first region by a vehicle, upon recognizing the smart key, activating a distance sensor of a camera and a parking assistance system (PAS) by the vehicle, recognizing a driver having the smart key through the activated camera, setting a position of the driver as a reference point by the vehicle, and calculating a detected distance of the driver and the vehicle through the PAS, and after the setting of the reference point and the calculating of the detected distance, moving forward or backward based on the detected distance or turning left or right based on a change in a position of the driver in right and left directions with respect to the reference point while receiving a parking signal from the smart key.

The method may further include stopping the vehicle when the vehicle does not receive a parking signal from the smart key or a detected distance of the driver or an obstacle is equal to or less than a threshold distance.

The recognizing of the smart key may be performed after activating starting by the vehicle.

The activating of the starting may further include activating the starting of the vehicle by receiving a first signal from the smart key positioned in a second region.

The recognizing of the smart key may further include, upon receiving a second signal from the vehicle by the smart key, transmitting a third signal including authentication information of the smart key, and upon receiving the third signal by the vehicle, determining whether the smart key is an authenticated smart key.

The calculating of the detected distance of the driver and the vehicle through the PAS may further include identifying the detected distance with at least two preset levels that are divided based on a threshold range set according to the calculated detected distance.

The PAS may include at least one ultrasonic sensor, and the calculating of the detected distance of the driver and the vehicle through the PAS may further include transmitting and receiving an ultrasonic wave by the at least one ultrasonic sensor and calculating the detected distance.

The moving forward or backward or the turning left or right may include moving forward when the detected distance is increased, moving backward when the detected distance is reduced, turning right when the driver is positioned right of the reference point, and turning left when the driver is positioned left of the reference point.

The moving forward when the detected distance is increased, the moving backward when the detected distance is reduced, the turning right when the driver is positioned right of the reference point, or the turning left when the driver is positioned left of the reference point may further include controlling at least one of a drive a drive system, a brake system, and a steering system of the vehicle.

The moving forward when the detected distance is increased, the moving backward when the detected distance is reduced, the turning right when the driver is positioned right of the reference point, or the turning left when the driver is positioned left of the reference point may further include changing a steering angle of the steering system in consideration of a distance degree by which the driver is positioned right or left of the reference point.

The first region may be a region in which the vehicle is capable of recognizing the smart key by receiving a third signal from the smart key, and the second region may be a region in which the vehicle is capable of activating starting of the vehicle by receiving the first signal from the smart key.

In another aspect of the present disclosure, an apparatus for remotely controlling vehicle parking includes a controller for, upon recognizing the smart key in a first region, activating a distance sensor of a camera and a parking assistance system (PAS), recognizing a driver having the smart key through the activated camera, and setting a position of the driver as a reference point by the vehicle, and a communication unit for receiving a detected distance of the driver and the vehicle, measured by the PAS, wherein the communication unit receives information about whether the smart key is recognized from a smart key system (SMK) for transmitting and receiving a signal for recognition of the smart key to and from the smart key in the first region, and after setting of the reference point and receiving the detected distance, the controller controls at least one of a drive system, a brake system, and a steering system to move forward or backward based on the detected distance or to turn left or right based on a change in a position of the driver in right and left directions with respect to the reference point while the SMK receives a parking signal from the smart key.

The controller may control at least one of a drive system, a brake system, and a steering system to stop the vehicle when the SMK does not receive the parking signal from the smart key or a detected distance of the driver or an obstacle is equal to or less than a threshold distance.

Upon receiving a first signal for starting in a second region from the smart key in a second region by the SMK, the SMK may transmit a second signal for recognition of the smart key.

The communication unit may transmit information about whether the smart key is recognized upon receiving a third signal containing authentication information from the smart key.

The apparatus may further include a memory for storing the authentication information.

When the communication unit receives the detected distance from the PAS including at least one ultrasonic sensor, the controller may identify the detected distance with at least two preset levels that are divided based on a threshold range set according to the calculated detected distance.

The controller may control at least one of a drive system, a brake system, and a steering system to move forward when the detected distance is increased, to move backward when the detected distance is reduced, to turn right when the driver is positioned right of the reference point, or to turn left when the driver is positioned left of the reference point.

The controller may change a steering angle of the steering system in consideration of a distance degree by which the driver is positioned right or left of the reference point.

The SMK may include a long frequency (LF) antenna.

The communication unit may be connected to the SMK and the camera via a CAN communication and connected to the PAS via LIN communication.

The first region may be a region in which the vehicle is capable of recognizing the smart key by receiving a third signal from the smart key, and the second region may be a region in which the vehicle is capable of activating starting of the vehicle by receiving the first signal from the smart key.

The apparatus may further include a body control module (BCM).

In another aspect of the present disclosure, a computer readable recording medium has recorded thereon a program for executing the method.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Reference will now be made in detail to the preferred embodiments of the present disclosure, examples of which are illustrated in the accompanying drawings. In addition, the suffixes "module" and "unit" of elements herein are used for convenience of description and thus can be used interchangeably and do not have any distinguishable meanings or functions.

In the description of the present disclosure, certain detailed explanations of related art are omitted when it is deemed that they may unnecessarily obscure the essence of the disclosure.

The present disclosure uses a smart key system (SMK), a parking assistance system (PAS), and a camera in order to remotely control parking of a vehicle.

In detail, a method and apparatus for remotely controlling vehicle parking according to an embodiment of the present disclosure may recognize a driver using an SMK, calculate a distance between a vehicle and the recognized driver using the PAS, and recognize a change in a position of the driver through a camera so as to remotely control parking or pulling out of the vehicle according to a movement of the driver.

Figure 1:
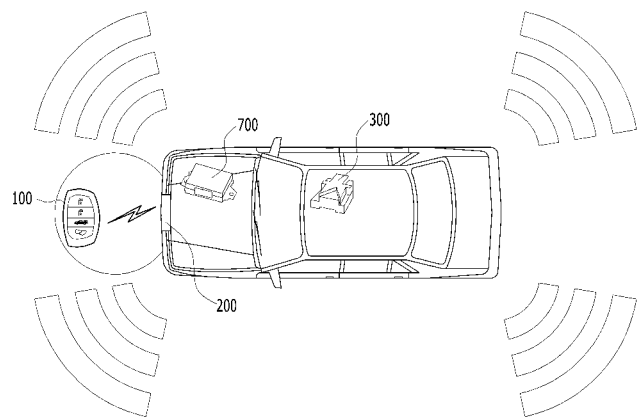
FIG. 1 is a diagram for explanation of components for embodying a method and apparatus for remotely controlling vehicle parking according to an embodiment of the present disclosure.
Figure 2:
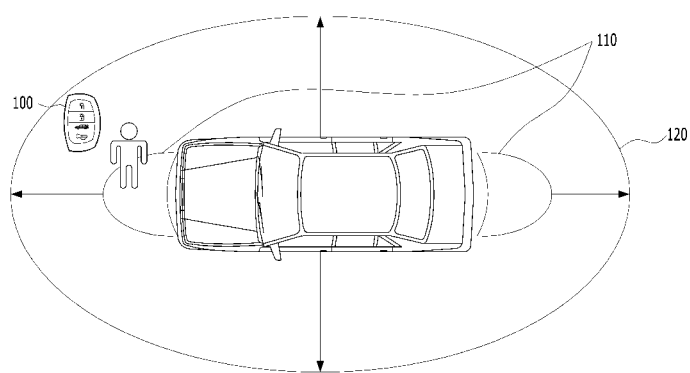
FIG. 2 is a diagram for explanation of a first region and a second region in a method and apparatus for remotely controlling vehicle parking according to an embodiment of the present disclosure.

With reference to FIG. 1, an overall function of components for embodying a method and apparatus for remotely controlling vehicle parking according to an embodiment of the present disclosure will be described. With reference to FIG. 2, definitions of terms related to a first region and a second region will be described.

Then, with reference to FIGS. 3 to 5, a method for remotely controlling vehicle parking according to embodiments of the present disclosure will be described in detail. With reference to FIGS. 6 to 11, vehicle parking modes will be described.

Lastly, with reference to FIGS. 12 and 13, an apparatus for remotely controlling vehicle parking according to an embodiment of the present disclosure will be described based on the method for remotely controlling vehicle parking.

FIG. 1 is a diagram for explanation of components for embodying a method and apparatus for remotely controlling vehicle parking according to an embodiment of the present disclosure.

Referring to FIG. 1, an apparatus for remotely controlling vehicle parking according to an embodiment of the present disclosure may include a smart key system (SMK) 200 for wirelessly communicating with a smart key 100, a camera 300, and a parking assistance system (PAS) 700.

The components illustrated in FIG. 1 are not necessary and, thus, greater or fewer components than in FIG. may constitute the apparatus for remotely controlling vehicle parking.

Hereinafter, the components will be described in detail.

The SMK 200 may be capable of wirelessly communicating with the smart key 100. The SMK 200 may receive a signal from the smart key 100 to remotely perform vehicle door control or starting control.

According to an embodiment of the present disclosure, the SMK 200 may wirelessly receive a starting signal for the vehicle from the smart key 100. The SMK 200 may include a wireless receiver for receiving the starting signal of the vehicle and checking whether a code to be contained in the starting signal is matched so as to turn on the vehicle.

According to an embodiment of the present disclosure, the smart key 100 may include a parking button, and thus while a driver pushes the parking button, remote parking control according to the embodiment of the present disclosure may be performed, which will be described below.

According to a communication method between the smart key 100 and the SMK 200, a first region and a second region, in which the vehicle is capable of recognizing the smart key 100 outside the vehicle, may be defined, which will be described along with the definition of the terms of FIG. 2.

As an example of the embodiment of the present disclosure, the PAS 700 may indicate a distance from an obstacle during parking or backing to the driver through an audible signal or visual information.

The PAS 700 may include ultrasonic sensors (distance sensors) installed in front of or behind the vehicle, an ECU, an indicator lamp, and a warning buzzer. The ultrasonic sensors may operate according to an echo sounding principle and may be used to monitor a distance and gap from an obstacle. The ultrasonic sensors may be periodically and sequentially activated and may transmit an ultrasonic signal of 30 kHz or 48 kHz. Then, all of the ultrasonic sensors may be switched to a reception mode to receive a sound wave reflected by the obstacle and may calculate a distance from the obstacle and a spatial position of the obstacle based on travel time of an echo-sound signal. When the distance is small, a warning signal may be transmitted to the driver so as to indicate the distance from the obstacle.

The PAS 700 may have a display device so as to allow the driver to easily and accurately check where the obstacle is positioned through the display device.

The camera 300 may be installed inside or outside the vehicle, may more accurately identify a position of the driver together with the PAS 700, and may provide information for recognition of change in the position of the driver.

A method for providing information for recognition of change in a position of a driver by the camera 300 will be described below in detail with reference to FIG. 4.

FIG. 2 is a diagram for explanation of a first region 110 and a second region 120 in a method and apparatus for remotely controlling vehicle parking according to an embodiment of the present disclosure.

The first region 110 and the second region 120 may be defined according to used frequencies and purposes of the SMK 200 and the smart key 100. According to an embodiment of the present disclosure, the second region 120 will be first described according to an order of a method for remotely controlling vehicle parking.

The second region 120 may be a region within which the driver is capable of activating starting of the vehicle using the smart key 100.

According to an embodiment of the present disclosure, when the driver pushes a button of a smart key, for vehicle starting, the smart key may transmit a signal (a first signal) for vehicle starting to the vehicle using an ultrahigh frequency (UHF) of 300 to 3,000 MHz. The second region may be defined as a region in which the vehicle is capable of receiving the first signal when the smart key transmits the first signal.

For example, when the smart key is 30 m from the vehicle and transmits a signal for activation of vehicle starting at a frequency of 433 MHz, the vehicle may not receive the signal for activation of vehicle starting. On the other hand, the vehicle may be capable of receiving a signal transmitted from the smart key within a radius of 30 m of the vehicle, and in this case, the second region may be defined as a radius of 30 m.

The first region 110 may be a region in which the camera 300 and the PAS 700 are capable of recognizing a driver who has the smart key 100. The driver may push the parking button of the smart key to activate remote parking control in the first region 110, and in this regard, the parking control apparatus may perform authentication for whether parking control is performed based on a person positioned in the first region prior to activation of remote parking control. When authentication is completed, the parking control apparatus may recognize a position of a driver positioned in the first region through the camera 300 and calculate a distance (hereinafter, referred to as a "detected distance") from the driver through the PAS 700.

When vehicle starting is activated, the vehicle may periodically (e.g., 480 msec) generate a signal (a second signal) for authentication. The second signal may be received by the smart key 100 and a third signal containing authentication information may be transmitted to the vehicle in response to the second signal. The vehicle may receive the third signal containing the authentication information and authenticate the smart key 100 that emits the third signal through encryption processing.

According to an embodiment of the present disclosure, when vehicle starting is activated, the vehicle may transmit the second signal to the smart key using a long wave frequency (LF) of 30 to 300 KHz. In this case, a region in which the smart key is capable of receiving the second signal may be the first region. Then the smart key may transmit the third key containing authentication information in response to the second signal.

For example, when the smart key is 3 to 5 m from the vehicle and the vehicle transmits the second signal at a frequency of 124 KHz, the smart key may not receive the second signal. On the other hand, when the smart key is positioned within a radius of 3 to 5 m of the vehicle, the smart key may receive the second signal, and in this situation, the first region may be defined as a radius of 4 m.

A method for remotely controlling vehicle parking according to an embodiment of the present disclosure will be described with reference to FIG. 3 based on the above description of the first region, the second region, the first signal, the second signal, and the third signal.

Figure 3:
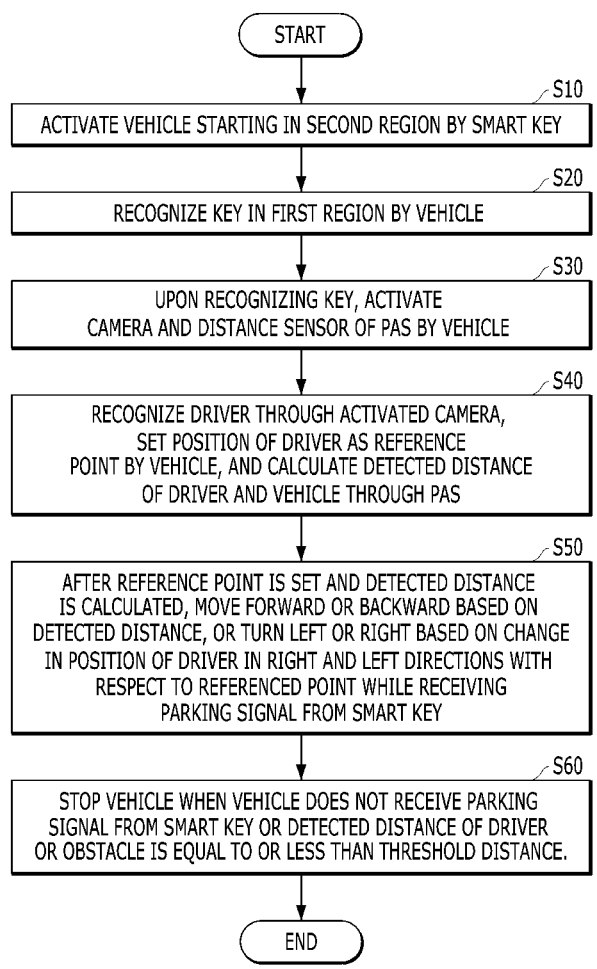
FIG. 3 is a flowchart of a method for remotely controlling vehicle parking according to an embodiment of the present disclosure.

FIG. 3 is a flowchart of a method for remotely controlling vehicle parking according to an embodiment of the present disclosure.

Referring to FIG. 3, a smart key activates vehicle starting in the second region (S10). In more detail, the smart key may transmit the first signal for activation of vehicle starting, and the vehicle may receive the first signal and activate vehicle starting.

When vehicle starting is activated and the smart key is positioned in the first region, the vehicle may recognize the smart key (S20).

In detail, the vehicle may transmit the second signal in order to recognize the smart key, and the smart key that receives the second signal may transmit the third signal containing authentication information so as to allow the vehicle to recognize the smart key.

When the vehicle recognizes the smart key, the vehicle may activate a camera and a PAS (S30).

The vehicle may recognize a driver through the activated camera, set a position of the driver as a reference point, and calculate a detected distance of the driver and the vehicle through the PAS (S40).

A method for setting a position of a driver as a reference point through a camera by a vehicle will be described in detail with reference to FIG. 4.

The vehicle may be controlled to move forward or backward based on the detected distance, or to turn left or right based on a change in a position of the driver in right and left directions with respect to the reference point while receiving a parking signal from the smart key after setting the reference point and calculating the detected distance (S50).

For example, when the detected distance is increased, the vehicle may move forward, and when the detected distance is reduced, the vehicle may move backward. In addition, when the driver is positioned right based on the reference point, the vehicle may be controlled to turn right, and when the driver is positioned left based on the reference point, the vehicle may be controlled to turn left.

To this end, the vehicle may control at least one of a drive system, a brake system, and a steering system to move forward and backward and to turn left and right.

When the vehicle does not receive a parking signal from the smart key or a detected distance from the driver or an obstacle is equal to or less than a threshold distance, the vehicle may stop (S60).

When the distance between the vehicle and the driver is less than a predetermined threshold distance, the vehicle may unconditionally stop so as to ensure driver safety. In addition, the driver may release the parking button of the smart key so as to stop vehicle parking.

For example, when the threshold distance is set to 30 cm, if the driver or the obstacle approaches the vehicle within 30 cm, the vehicle may stop.

Figure 4:
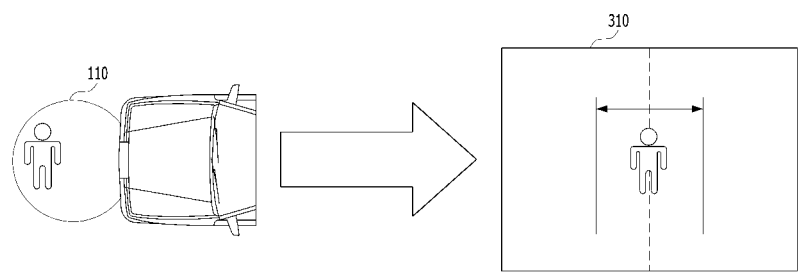
FIG. 4 is a diagram for explanation of a method for recognizing a position of a driver using a camera in a method for remotely controlling vehicle parking according to an embodiment of the present disclosure.

FIG. 4 is a diagram for explanation of a method for recognizing a position of a driver using a camera in a method for remotely controlling vehicle parking according to an embodiment of the present disclosure.

When the driver who has a smart key is positioned in the first region and recognition of the smart key by the vehicle is checked, the vehicle may activate the camera.

The camera may output an image captured through a display device 310. The vehicle may set an initial position of the driver as a reference point in the output image.

The driver is not necessarily positioned in front of the vehicle. Accordingly, even if the driver is not positioned in front of the vehicle, the vehicle may relatively identify a next position of the driver from the reference point and may recognize movement after the reference point is set.

According to an embodiment of the present disclosure, an error range for the reference point may be set to 1 cm in right and left directions.

Figure 5:
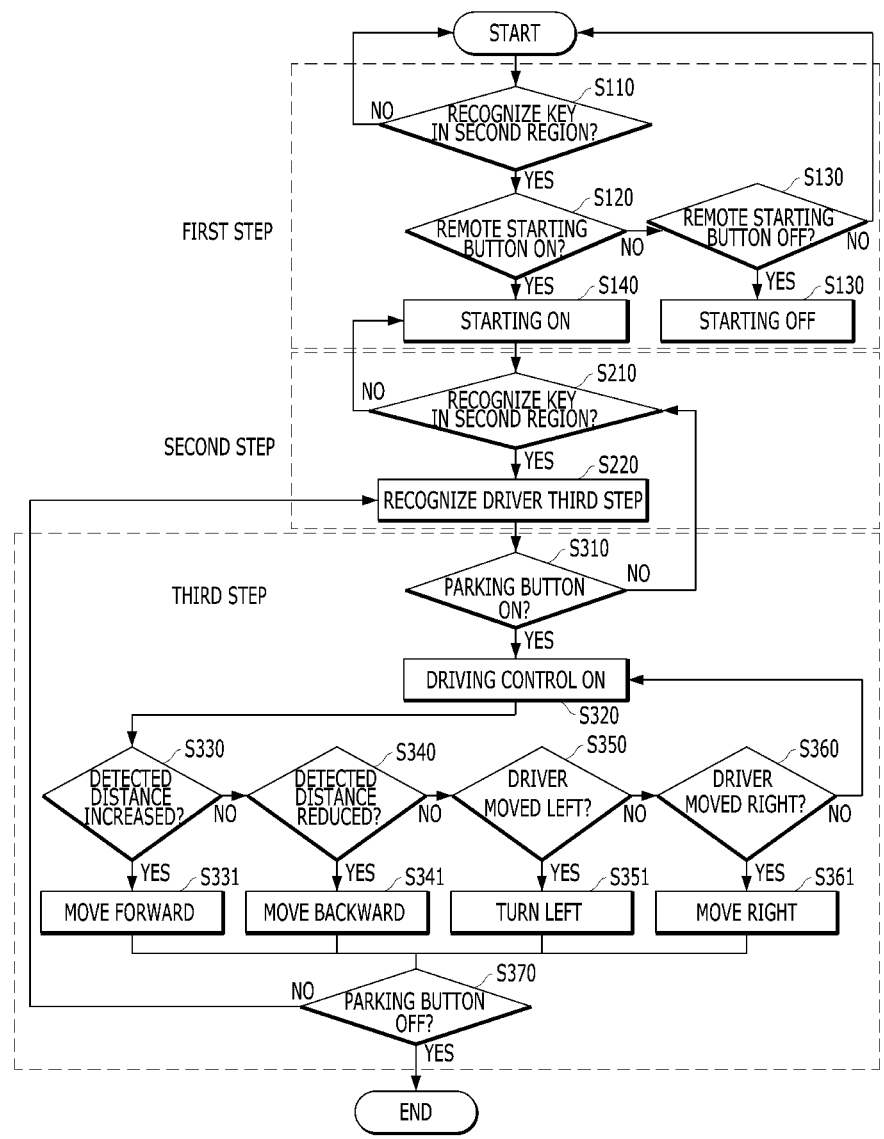
FIG. 5 is a flowchart for explanation of a method for remotely controlling vehicle parking in detail according to an embodiment of the present disclosure.

FIG. 5 is a flowchart for explanation of a method for remotely controlling vehicle parking in detail according to an embodiment of the present disclosure.

Referring to FIG. 5, the remote parking control method may include three steps. A first step may be a step for activating vehicle starting using a smart key in the second region. A second step may be a step for recognizing the smart key by the vehicle in the first region. A third step may be a step for remote parking control using a parking button of the smart key. Hereinafter, the steps will be described in detail.

In the first step, the vehicle may determine whether a smart key is recognized in the second region (S110) and determine whether an ON signal for remote starting from the recognized smart key is received in the second region (S120).

Upon receiving the ON signal for vehicle starting (YES of S120), the vehicle may activate vehicle starting (S140). However, upon receiving a starting OFF signal after receiving the ON signal for vehicle starting (YES of S130), the vehicle may deactivate starting (S130).

In the second step, upon determining whether the smart key is recognized in the first region (S210) and recognizing the smart key in the first region (YES of S210), the vehicle may activate a camera, recognize the position of the driver, and set a reference point (S220).

In the third step, when the driver pushes a parking button of the smart key (S310), remote parking control may be activated (S320). In detail, while the driver pushes the parking button, remote parking control may be activated, and when the driver is detached from (releases) the parking button, the vehicle stops.

In order to perform remote parking control, the vehicle may determine a detected distance and movement of the driver based on the reference point in S330 to S360. In this regard, the embodiments of the present disclosure are not limited to an order of S330 to S360. In other words, in the third step, remote parking control is performed in an order of forward movement, backward movement, left turn, and right turn, but the embodiments of the present disclosure are not limited as to such an order.

The vehicle may store a detected distance transmitted from a PAS in a memory, may control forward movement when a detected distance that is transmitted thereafter at a predetermined periodicity is relatively increased (becomes further away) (S331), and may control backward movement when the detected distance that is transmitted thereafter at a predetermined periodicity is relatively reduced (approaches) (S341).

The vehicle may receive a captured image from a camera, may control a left turn when a relative position of the drier, which is transmitted after a predetermined period, is left of an initially set reference point (S351), and may control a right turn when the relative position of the driver, which is transmitted after a predetermined period, is right of the initially set reference point (S361)

Then, when the driver turns off (releases) the parking button (YES of S370), the vehicle may stop.

Figure 6:
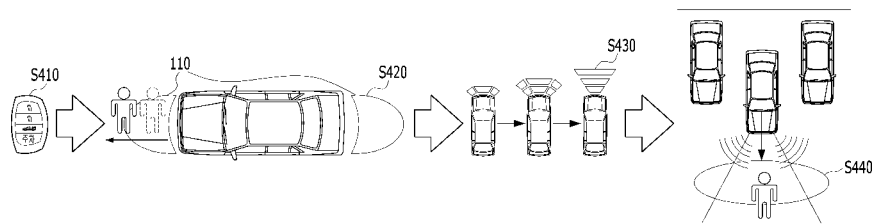
FIG. 6 is a diagram for explanation of forward movement of a method for remotely controlling vehicle parking according to an embodiment of the present disclosure.
Figure 7:
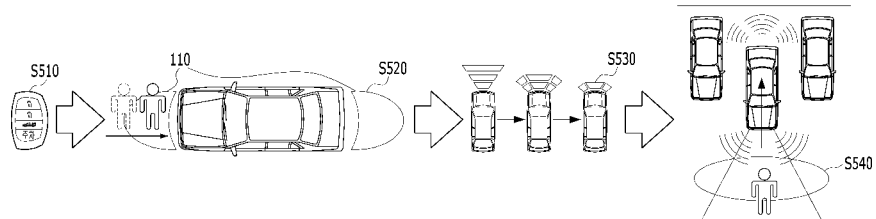
FIG. 7 is a diagram for explanation of backward movement in a method for remotely controlling vehicle parking according to an embodiment of the present disclosure.

FIG. 6 is a diagram for explanation of forward movement of a method for remotely controlling vehicle parking according to an embodiment of the present disclosure. FIG. 7 is a diagram for explanation of backward movement in a method for remotely controlling vehicle parking according to an embodiment of the present disclosure.

Forward and backward movement control is performed based on a detected distance transmitted from a PAS, and thus will be described together with the detected distance.

Referring to FIG. 6, when a driver pushes a parking button of a smart key (S410), a vehicle may perform remote parking control.

Vehicle parking may be activated before the driver pushes (ON) the parking button, and the vehicle recognizes the smart key and sets a reference point. In this state, the PAS may calculate a detected distance of the driver and the vehicle. In this regard, the PAS may include at least one ultrasonic sensor and the at least one ultrasonic sensor may transmit and receive ultrasonic waves to calculate the detected distance. The PAS may transmit and receive an ultrasonic wave every predetermined period and may continuously calculate the detected distance (S420).

For example, the PAS may set the predetermined period to 0.5 seconds and calculate the detected distance every period of 0.5 seconds.

In addition, the vehicle may identify a detected distance calculated by the ultrasonic sensor with two or more preset levels that are divided according to a set threshold range (S430).

For example, the vehicle may distinguish the detected distance in three steps and determine a first step as a threshold range of 90 cm or more, a second step as a threshold range of less than 90 cm, and a third step as a threshold range of less than 30 cm.

When the detected distance from a current driver is 25 cm during recognition of an initial position of the driver, the vehicle may identify the third step, may identify the second step when the detected distance is 50 cm after 1 second, and identify the first step when the detected distance is 90 cm after two seconds.

By virtue of this identification, when a current state is changed to the first step from the third step through the second step, the vehicle may determine that the vehicle and the driver move apart.

Upon determining that the vehicle and the driver move apart, or move away from each other, the vehicle may control forward movement (S440).

The vehicle may control at least one of a drive system, a brake system, and a steering system in order to control forward movement.

For example, the vehicle may control a steering angle to correspond to a target forward direction in a D state of a transmission and control forward movement in a release state of a brake.

FIG. 7 is different from FIG. 6 in that the vehicle controls backward movement as the detected distance is reduced.

Figure 8:
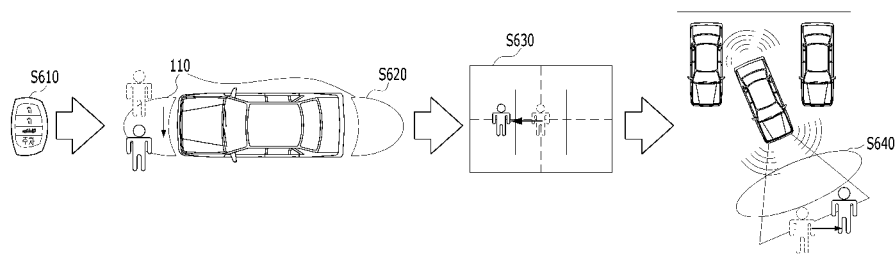
FIG. 8 is a diagram for explanation of left turn control in a method for remotely controlling vehicle parking according to an embodiment of the present disclosure.
Figure 9:
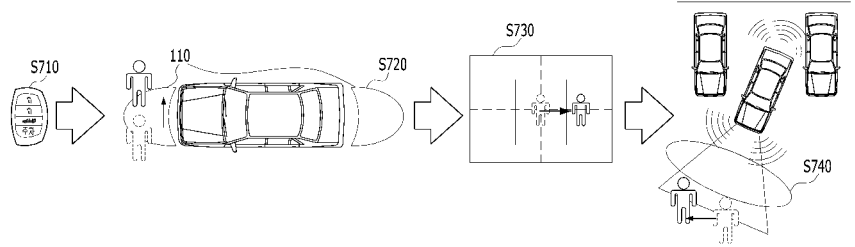
FIG. 9 is a diagram for explanation of right turn control in a method for remotely controlling vehicle parking according to an embodiment of the present disclosure.

FIG. 8 is a diagram for explanation of left turn control in a method for remotely controlling vehicle parking according to an embodiment of the present disclosure. FIG. 9 is a diagram for explanation of right turn control in a method for remotely controlling vehicle parking according to an embodiment of the present disclosure.

Left and right turn control is performed based on movement of a driver according to a driver position photographed by a camera, and thus will be described together with the driver movement.

Referring to FIG. 8, when a driver pushes a parking button of a smart key (S610), a vehicle may perform remote parking control. Vehicle parking is activated before the driver pushes (ON) the parking button, and the vehicle recognizes the smart key and sets a reference point. Setting of the reference point has been described with reference to FIG. 4, and a detailed description thereof will thus be omitted.

A camera may calculate positional information of the driver every predetermined period (S620 and S720) and identify whether a next position of the driver from an initial reference point is relatively left or right (S630 and S730).

Based on the determination, when the driver position is positioned left of the reference point after the reference point is set, the vehicle may control a left turn (S640) and when the driver position is positioned right of the reference point after the reference point is set, the vehicle may control a right turn (S740).

Figure 10:
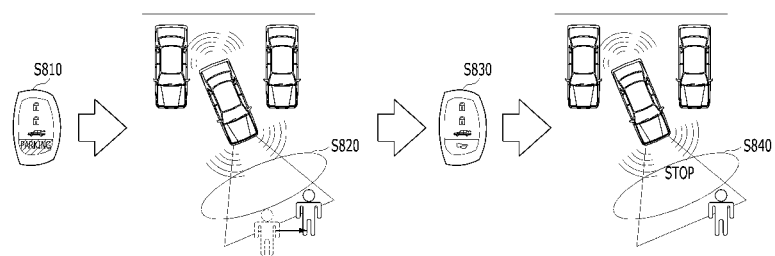
FIG. 10 is a diagram for explanation of stop control according to button release in a method for remotely controlling vehicle parking according to an embodiment of the present disclosure.
Figure 11:
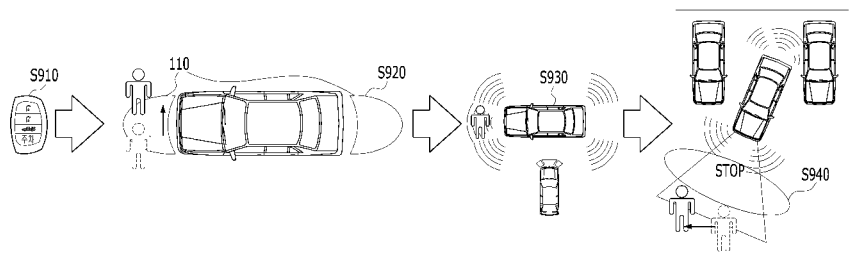
FIG. 11 is a diagram for explanation of stop control according to obstacle appearance in a method for remotely controlling vehicle parking according to an embodiment of the present disclosure.

FIG. 10 is a diagram for explanation of stop control according to button release in a method for remotely controlling vehicle parking according to an embodiment of the present disclosure. FIG. 11 is a diagram for explanation of stop control according to obstacle appearance in a method for remotely controlling vehicle parking according to an embodiment of the present disclosure.

FIGS. 10 and 11 are diagrams for explanation of brake control of a vehicle.

As described above, remote parking control of the vehicle is performed while the driver pushes (ON) a parking button of a smart key and the vehicle stops when the driver releases (OFF) the parking button.

Although FIG. 10 illustrates a case in which the vehicle stops as the parking button is released during left turn control of the vehicle, stop control of the vehicle according to release of the parking button may be performed irrespective of a current control type.

Referring to FIG. 11, when an obstacle appears around the vehicle or a detected distance from a driver is less than a predetermined distance during right turn control of the vehicle, the vehicle may perform stop control.

A PAS may continuously calculate the detected distance through an ultrasonic sensor and may perform stop control when the detected distance is equal to or less than a predetermined distance (e.g., 30 cm). This serves to ensure driver safety.

In addition, the PAS may calculate a distance from an obstacle other than the driver through a plurality of ultrasonic sensors and the vehicle may perform stop control when the distance from the obstacle is equal to or less than a predetermined distance (e.g., 30 cm).

Figure 12:
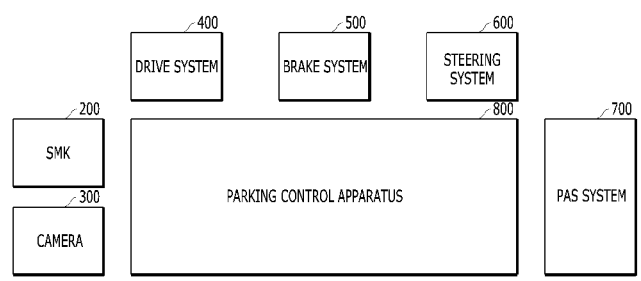
FIG. 12 is a diagram for explanation of components of a system for remotely controlling vehicle parking according to an embodiment of the present disclosure.

FIG. 12 is a diagram for explanation of components of a system for remotely controlling vehicle parking according to an embodiment of the present disclosure.

The system for remotely controlling vehicle parking may include the SMK 200, the camera 300, a drive system 400, a brake system 500, a steering system 600, a PAS system 700, and a parking control apparatus 800.

The components illustrated in FIG. 12 are not necessary and, thus, greater or fewer components than in FIG. 12 may constitute the system for remotely controlling vehicle parking.

As an example of the embodiment of the present disclosure, the components may be connected to the parking control apparatus 800 of the vehicle via a controller area network (CAN), local interconnect network (LIN), and/or hardwired communication but embodiments of the present disclosure are not limited to the vehicular communication.

The SMK 200, the camera 300, and the PAS 700 have been described with reference to FIG. 1, and thus a detailed description thereof will be omitted.

The drive system 400 may perform velocity control, phase synchronization control, speed change control, and so on for driving the vehicle.

According to an embodiment of the present disclosure, according to control of the parking control apparatus 800, power transmission and speed change that are required for forward and backward movement and right and left turn of the vehicle may be controlled.

The brake system 500 may control a brake apparatus of the vehicle, such as a brake. According to an embodiment of the present disclosure, stop control of the vehicle may be performed according to control of the parking control apparatus 800.

The steering system 600 may control a steering apparatus of the vehicle, such as a steering wheel. According to an embodiment of the present disclosure, control of a right and a left turn of the vehicle may be performed according to control of the parking control apparatus 800.

The parking control apparatus 800 may control an overall remote parking control system of the vehicle and perform a calculation required for transmission of signals and data for remote parking control of the vehicle and remote parking control.

Hereinafter, the parking control apparatus 800 will be described in detail with reference to FIG. 13.

Figure 13:
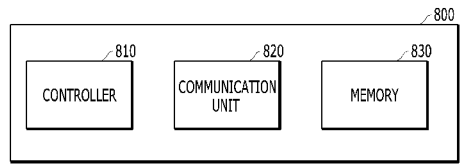
FIG. 13 is a diagram for structures of components of an apparatus for remotely controlling vehicle parking according to an embodiment of the present disclosure.

FIG. 13 is a diagram of structures of components of an apparatus 800 for remotely controlling vehicle parking according to an embodiment of the present disclosure.

The apparatus may include a controller 810, a communication unit 820, and a memory 830.

The components illustrated in FIG. 13 are not necessary and, thus, greater or fewer components than in FIG. 13 may constitute the parking control apparatus 800.

Hereinafter, the above components will be described in detail.

The controller 810 may perform data processing and a calculation in order to control an overall operation of the parking control apparatus 800.

According to an embodiment of the present disclosure, upon completing recognition of the smart key in the first region, the controller 810 may activate a camera and a PAS, recognize a driver by the activated camera, and set a driver position as a reference point, and then, after setting the reference point and receiving a detected distance, the controller 810 may control at least one of a drive system, a brake system, and a steering system to perform forward or backward movement based on the detected distance or to perform a left or right turn based on a change in the driver position in right and left directions with respect to the reference point while the SMK receives a parking signal from the smart key.

The communication unit 820 may transmit and receive signals and data for remote parking control to and from the SMK 200, the camera 300, the drive system 400, the brake system 500, the steering system 600, and the PAS 700 of FIG. 12.

According to an embodiment of the present disclosure, the communication unit 820 may receive a detected distance of the driver and the vehicle, which may be measured by a PAS, and receive information about whether a smart key is recognized, which is achieved from an SMK that transmits and receives signals for recognition of the smart key to and from the smart key in the first region.

The memory 830 may collectively refer to a space and/or an area for storing predetermined program code for control of an overall operation of the parking control apparatus 800 and data that are input/output during an operation according to the program code and may be provided in the form of an electrically erasable and programmable read only memory (EEPROM), a flash memory (FM), a hard disk drive, or the like.

According to an embodiment of the present disclosure, the memory 830 may include authentication information of the smart key and store a first period value at which the SMK generates a second signal, a second period value at which the PAS generates an ultrasonic signal, and a third period value at which a camera calculates positional information of a driver.

The method and apparatus for remotely controlling vehicle parking according to the embodiments of the present disclosure may have the following advantages.

First, when the method and apparatus according to the embodiments of the present disclosure are used, vehicle parking may be controlled while a driver is not in a vehicle to be parked, or the vehicle may be pulled out so as to overcome difficulties of an inexperienced driver in parking or pulling out the vehicle.

Second, vehicle parking may be controlled while a driver is not in a vehicle to be parked or pulled out so as to easily park or pull out the vehicle when an adequate space for getting into or out of the vehicle is not ensured due to a narrow parking space.

Third, time taken to park or pull out the vehicle in a narrow parking space may be reduced.

The aforementioned methods according to the embodiments of the present disclosure may be embodied as a program to be executed in a computer and stored in a computer readable recording medium. Examples of the computer readable recording medium include read-only memory (ROM), random-access memory (RAM), CD-ROMs, magnetic tapes, floppy disks, optical data storage devices, etc. In addition, the computer readable recording medium may be embodied in the form of a carrier wave (e.g., transmission via the Internet).

The computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

Those skilled in the art will appreciate that the present disclosure may be carried out in other specific ways than those set forth herein without departing from the spirit and essential characteristics of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for remotely controlling vehicle parking, the method comprising:
   recognizing a smart key by a vehicle in a first region;
   upon recognizing the smart key, activating a camera and a distance sensor of a parking assistance system (PAS) equipped in the vehicle;
   recognizing a position of a driver having the smart key through the activated camera;
   setting the recognized position of the driver as a reference point by the vehicle;
   calculating a detected distance between the driver and the vehicle through the PAS;
   controlling a first movement of the vehicle in a forward or backward direction while receiving a parking signal from the smart key based on the detected distance between the driver and the vehicle; and
   controlling a second movement of the vehicle to a left or right direction while receiving a parking signal from the smart key based on a change of the position of the driver from the reference point,
   wherein the reference point is set to an initial position of the driver in an image output by the camera,
   wherein the controlling of the first movement comprises:
      moving the vehicle forward when the detected distance is increased; and
      moving the vehicle backward when the detected distances is reduced, and
   wherein the controlling of the second movement comprises:
      turning the vehicle right when the driver is positioned right with respect to the reference point; and
      turning the vehicle left when the driver is positioned left with respect to the reference point.

2. The method according to claim 1, further comprising stopping the vehicle when the vehicle does not receive a parking signal from the smart key or
   when the detected distance of the driver or an obstacle is equal to or less than a threshold distance.

3. The method according to claim 2, wherein the recognizing the smart key is performed after activating starting of the vehicle.

4. The method according to claim 3, wherein the activating of the starting further comprises activating the starting of the vehicle by receiving a first signal from the smart key positioned in a second region.

5. The method according to claim 4, wherein:
   the first region is a region in which the vehicle is capable of recognizing the smart key by receiving the third signal from the smart key; and
   the second region is a region in which the vehicle is capable of activating starting of the vehicle by receiving the first signal from the smart key.

6. The method according to claim 3, wherein the recognizing of the smart key further comprises:
   at the smart key, upon receiving a second signal from the vehicle, transmitting a third signal comprising authentication information of the smart key to the vehicle; and
   at the vehicle, upon receiving the third signal from the smart key, recognizing the smart key based on the authentication information.

7. The method according to claim 3, wherein the calculating of the detected distance of the driver and the vehicle through the PAS further comprises identifying the detected distance with at least two preset levels that are divided based on a threshold range set according to the calculated detected distance.

8. The method according to claim 3, wherein:
   the PAS comprises at least one ultrasonic sensor; and
   the calculating of the detected distance of the driver and the vehicle through the PAS further comprises transmitting and receiving an ultrasonic wave by the at least one ultrasonic sensor and calculating the detected distance.

9. The method of claim 1, wherein the moving of the vehicle forward when the detected distance is increased, the moving of the vehicle backward when the detected distance is reduced, the turning of the vehicle right when the driver is positioned right of the reference point, or the turning of the vehicle left when the driver is positioned left of the reference point further comprises controlling at least one of a drive system, a brake system, and a steering system of the vehicle.

10. The method of claim 9, wherein the moving of the vehicle forward when the detected distance is increased, the moving of the vehicle backward when the detected distance is reduced, the turning of the vehicle right when the driver is positioned right of the reference point, or the turning of the vehicle left when the driver is positioned left of the reference point further comprises changing a steering angle of the steering system in consideration of a distance degree by which the driver is positioned right or left of the reference point.

11. An apparatus for remotely controlling vehicle parking, the apparatus comprising:
    a controller for, upon recognizing the smart key by a vehicle in a first region activating a camera and a distance sensor of a parking assistance system (PAS) equipped in the vehicle, recognizing a position of a driver having the smart key through the camera, and setting the recognized position of the driver as a reference point by the vehicle; and
    a transceiver configured to receive a detected distance between the driver and the vehicle, measured by the PAS,
    wherein the transceiver receives information about whether the smart key is recognized from a smart key system (SMK) for transmitting and receiving a signal for recognition of the smart key to and from the smart key in the first region; and
    after setting of the reference point and receiving the detected distance, while the SMK receives a parking signal from the smart key, the controller controls at least one of a drive system, a brake system, and a steering system to move forward or backward direction based on the detected distance between the driver and the vehicle and to move left or right direction based on a change of the position of the driver from the reference point
    wherein the reference point is set to an initial position of the driver in an image output by the camera, and
    wherein the controller controls at least one of a drive system, a brake system, and a steering system to move the vehicle forward when the detected distance is increased, to move the vehicle backward when the detected distance is reduced, to turn the vehicle right when the driver is positioned right with respect to the reference point, or to turn the vehicle left when the driver is positioned left with respect to the reference point.

12. The apparatus according to claim 11, wherein the controller controls the at least one of the drive system, the brake system, and the steering system to stop the vehicle when the SMK does not receive the parking signal from the smart key or when the detected distance of the driver or an obstacle is equal to or less than a threshold distance.

13. The apparatus according to claim 12, wherein the transceiver transmits information about whether the smart key is recognized upon receiving a third signal containing authentication information from the smart key.

14. The apparatus according to claim 12, wherein, when the transceiver receives the detected distance from the PAS comprising at least one ultrasonic sensor, the controller identifies the detected distance with at least two preset levels that are divided based on a threshold range set according to the calculated detected distance.

15. The apparatus according to claim 12, wherein the SMK comprises a long frequency (LF) antenna.

16. The apparatus according to claim 12, wherein the transceiver is connected to the SMK and the camera via a controller area network (CAN) communication and is connected to the PAS via a local interconnect network (LIN) communication.

17. The apparatus according to claim 11, wherein, upon receiving a first signal for starting from the smart key in a second region by the SMK, the SMK transmits a second signal for recognition of the smart key.

18. The apparatus according to claim 17, further comprising a memory for storing an authentication information.

19. The apparatus according to claim 17, wherein:
the first region is a region in which the vehicle is capable of recognizing the smart key by receiving a third signal from the smart key; and
the second region is a region in which the vehicle is capable of activating starting of the vehicle by receiving the first signal from the smart key.

20. The apparatus according to claim 11, wherein the controller changes a steering angle of the steering system in consideration of a distance degree by which the driver is positioned right or left of the reference point.

21. The apparatus according to claim 11, further comprising a body control module (BCM).

22. A non-transitory computer readable recording medium having recorded thereon a program for executing a method for remotely controlling vehicle parking, the method comprising:
recognizing a smart key by a vehicle in a first region;
upon recognizing the smart key, activating a camera and a distance sensor of a parking assistance system (PAS) equipped in the vehicle;
recognizing a position of a driver-having the smart key through the activated camera;
setting the recognized position of the driver as a reference point by the vehicle;
calculating a detected distance between the driver and the vehicle through the PAS;
after setting of the reference point and the calculating of the detected distance, while receiving a parking signal from the smart key, controlling a first movement of the vehicle in a forward or backward direction based on the detected distance between the driver and the vehicle and controlling a second movement of the vehicle to a left or right directions based on a change of the position of the driver from the reference point
wherein the reference point is set to an initial position of the driver in an image output by the camera,
wherein the controlling first movement comprises:
moving the vehicle forward when the detected distance is increased; and
moving the vehicle backward when the detected distance is reduced;
wherein the controlling second movement comprises:
turning the vehicle right when the driver is positioned right with respect to the reference point; and
turning the vehicle left when the driver is positioned left with respect to the reference point.

* * * * *